(12) United States Patent
Wu et al.

(10) Patent No.: US 8,357,074 B2
(45) Date of Patent: Jan. 22, 2013

(54) ELECTRO-MECHANICAL TRANSMISSION CONTROL SYSTEM

(75) Inventors: Peter E. Wu, Lake Forest, CA (US); Ryan D. Martini, Wolverine Lake, MI (US); Syed Naqi, Ann Arbor, MI (US); Jy-Jen F. Sah, West Bloomfield, MI (US); Osama Almasri, Novi, MI (US); Hanne Buur, Brighton, MI (US); Andrew M. Zettel, Ann Arbor, MI (US); Charles J. Van Horn, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 439 days.

(21) Appl. No.: 12/956,219

(22) Filed: Nov. 30, 2010

(65) Prior Publication Data

US 2011/0070991 A1    Mar. 24, 2011

Related U.S. Application Data

(62) Division of application No. 11/861,635, filed on Sep. 26, 2007, now Pat. No. 7,867,135.

(51) Int. Cl.
*B60W 10/02* (2006.01)

(52) U.S. Cl. ............................................. 477/5; 477/907

(58) Field of Classification Search .................. 477/3, 5, 477/117, 127, 128, 129, 906, 907; 701/57, 701/58, 60, 62, 63
See application file for complete search history.

(56) References Cited

U.S. PATENT DOCUMENTS

| | | | |
|---|---|---|---|
| 5,833,570 A * | 11/1998 | Tabata et al. | 477/3 |
| 5,842,144 A * | 11/1998 | Coutant et al. | 701/62 |
| 6,832,148 B1 | 12/2004 | Bennett | |
| 6,868,318 B1 | 3/2005 | Cawthorne | |
| 6,953,409 B2 | 10/2005 | Schmidt et al. | |
| 7,051,859 B2 * | 5/2006 | Yurgil et al. | 192/219.2 |
| 7,154,236 B1 | 12/2006 | Heap | |
| 7,537,542 B2 | 5/2009 | Cawthorne et al. | |
| 7,648,440 B2 * | 1/2010 | Wu et al. | 477/180 |
| 7,867,135 B2 * | 1/2011 | Wu et al. | 477/5 |
| 2004/0029677 A1 * | 2/2004 | Mori et al. | 477/3 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 * | 4/2005 | Tao et al. | 701/34 |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |

(Continued)

*Primary Examiner* — Roger Pang

(57) ABSTRACT

A system for robust fault detection in an electrically variable, hydraulically controlled transmission includes independently monitoring hydraulic pressure within a hydraulic control circuit and electric machine rotation for detecting clutch state faults.

6 Claims, 4 Drawing Sheets

U.S. PATENT DOCUMENTS

| | | |
|---|---|---|
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1* | 7/2008 | Sah et al. ............... 475/117 |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1* | 11/2008 | Gleason et al. ............ 318/139 |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0076679 A1* | 3/2009 | Martini et al. ............ 701/34 |
| 2009/0082150 A1 | 3/2009 | Wu |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |

| | | | | | | |
|---|---|---|---|---|---|---|
| 2009/0118935 | A1 | 5/2009 | Heap | 2009/0118950 A1 | 5/2009 | Heap |
| 2009/0118936 | A1 | 5/2009 | Heap | 2009/0118951 A1 | 5/2009 | Heap |
| 2009/0118937 | A1 | 5/2009 | Heap | 2009/0118952 A1 | 5/2009 | Heap |
| 2009/0118938 | A1 | 5/2009 | Heap | 2009/0118954 A1 | 5/2009 | Wu |
| 2009/0118939 | A1 | 5/2009 | Heap | 2009/0118957 A1 | 5/2009 | Heap |
| 2009/0118940 | A1 | 5/2009 | Heap | 2009/0118962 A1 | 5/2009 | Heap |
| 2009/0118941 | A1 | 5/2009 | Heap | 2009/0118963 A1 | 5/2009 | Heap |
| 2009/0118942 | A1 | 5/2009 | Hsieh | 2009/0118964 A1 | 5/2009 | Snyder |
| 2009/0118943 | A1 | 5/2009 | Heap | 2009/0118969 A1 | 5/2009 | Heap |
| 2009/0118944 | A1 | 5/2009 | Heap | 2009/0118971 A1 | 5/2009 | Heap |
| 2009/0118945 | A1 | 5/2009 | Heap | 2009/0118999 A1 | 5/2009 | Heap |
| 2009/0118946 | A1 | 5/2009 | Heap | 2009/0144002 A1 | 6/2009 | Zettel |
| 2009/0118947 | A1 | 5/2009 | Heap | | | |
| 2009/0118948 | A1 | 5/2009 | Heap | | | |
| 2009/0118949 | A1 | 5/2009 | Heap | | | |

* cited by examiner

ELECTRO-MECHANICAL TRANSMISSION CONTROL SYSTEM

CROSS REFERENCE TO RELATED APPLICATIONS

This application is a divisional application of U.S. application Ser. No. 11/861,635 filed on Sep. 26, 2007 now U.S. Pat. No. 7,867,135, which is incorporated herein by reference.

TECHNICAL FIELD

This disclosure pertains generally to control systems for electro-mechanical transmissions.

BACKGROUND

The statements in this section merely provide background information related to the present disclosure and may not constitute prior art.

Powertrain architectures comprise torque-generative devices, including internal combustion engines and electric machines, which transmit torque through a transmission device to an output. One exemplary transmission is a two-mode, compound-split, electro-mechanical transmission which utilizes an input member for receiving motive torque from a prime mover power source, for example an internal combustion engine, and an output member for delivering motive torque from the transmission to a vehicle driveline. Electric machines, operable as motors or generators, generate a torque input to the transmission, independently of a torque input from the internal combustion engine. The electric machines may transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission operating state and gear shifting, controlling the torque-generative devices, and regulating the electrical power interchange between the electrical energy storage device and the electric machines.

The exemplary electro-mechanical transmission is selectively operative in fixed gear and continuously variable operating state ranges through selective control of torque transfer clutch states, via a hydraulic circuit. The fixed gear operating state range occurs when rotational speed of the transmission output member is a fixed ratio of rotational speed of the input member from the engine, due to application and release states of one or more torque transfer clutches. The continuously variable operating state ranges occur when rotational speed of the transmission output member is variable based upon operating speeds of one or more of the electric machines. The electric machines are connected to the output shaft via application of one or more clutches. Selective clutch control is effected through a hydraulic circuit.

SUMMARY

A method for redundant fault detection in an electrically variable, hydraulically controlled transmission operative to transmit mechanical power flow originating from an engine and electric machines to an output through selective application of torque transfer clutches includes monitoring hydraulic pressures within a hydraulic control circuit and detecting therefrom a mismatch between a commanded clutch state and an actual clutch state, and monitoring rotational speeds of electric machines and detecting therefrom a mismatch between a commanded clutch state and an actual clutch state.

BRIEF DESCRIPTION OF THE DRAWINGS

The disclosure may take physical form in certain parts and arrangement of parts, embodiments of which are described in detail and illustrated in the accompanying drawings which form a part hereof, and wherein.

DETAILED DESCRIPTION

Figure 1:
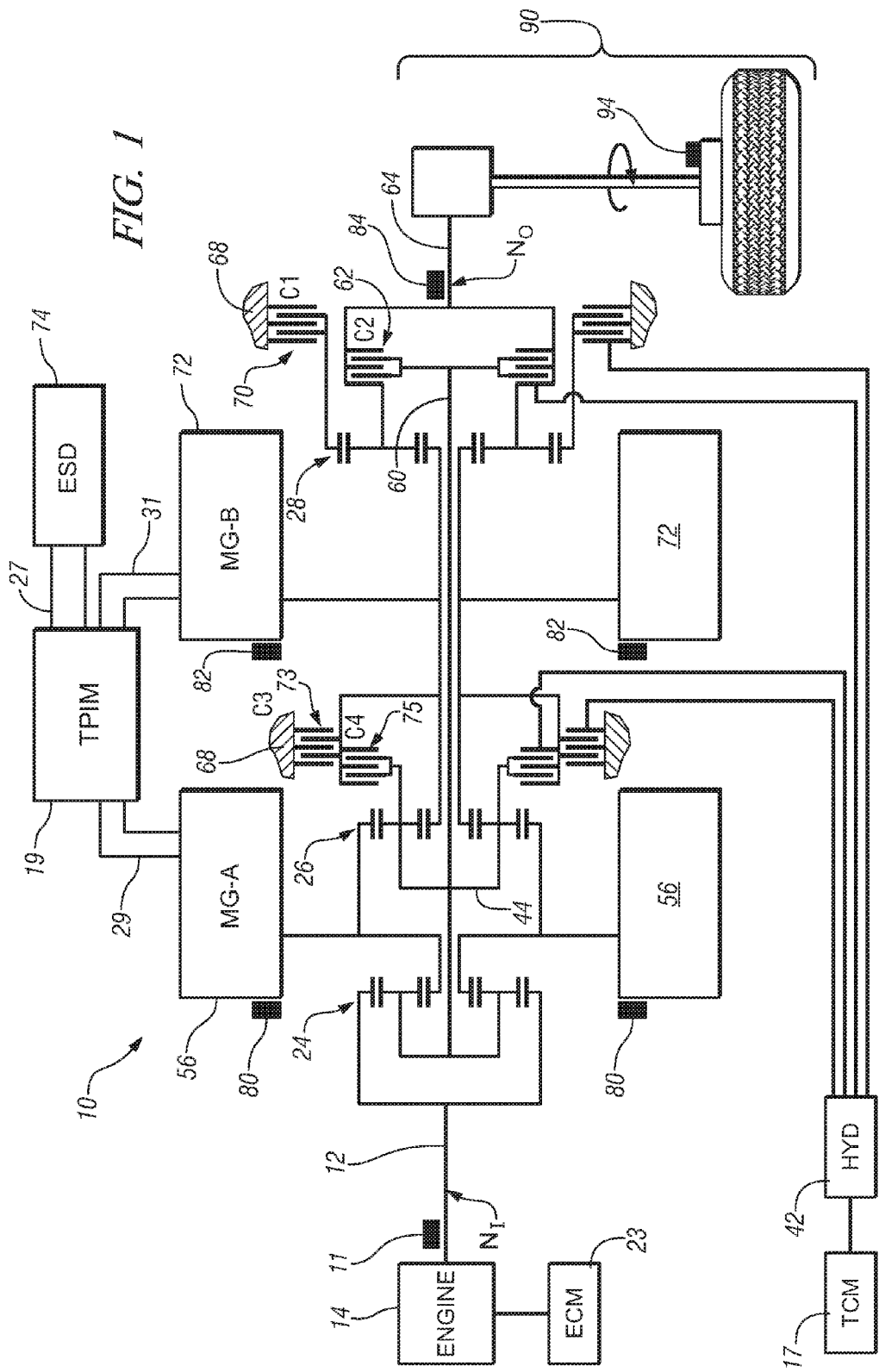
FIGS. 1-4 are schematic diagrams of an exemplary powertrain, in accordance with the present disclosure, and, FIG. 5 is a schematic diagram of an alternative embodiment of the powertrain, in accordance with the present disclosure.
Figure 2:
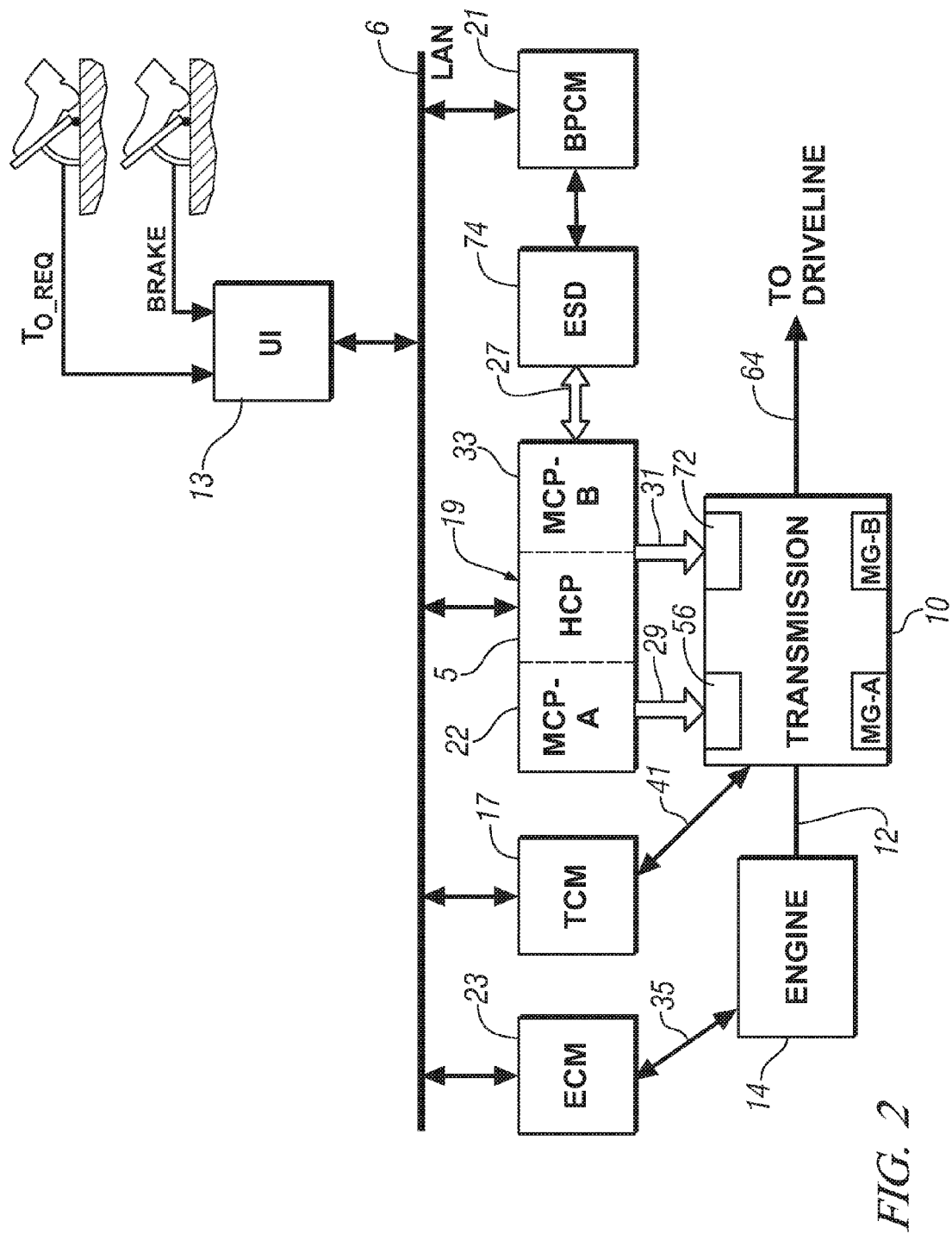

Referring now to the drawings, wherein the depictions are for the purpose of illustrating certain exemplary embodiments only and not for the purpose of limiting the same, FIGS. 1 and 2 depict a system comprising an engine 14, transmission 10 including electric machines 56 and 72, a control system, and hydraulic control circuit 42. The exemplary hybrid powertrain system is configured to execute the control scheme described and depicted herein.

Transmission device 10 is adapted to transmit torque from the internal combustion engine and electric machines to an output, e.g., a driveline for a vehicle, through selective control of hydraulically-controlled torque transfer clutches. As used herein, clutches refer to any type of friction torque transfer device including single or compound plate clutches or packs, band clutches, and brakes, for example. The control system includes two orthogonal subsystems, i.e., mutually independent subsystems, which redundantly monitor the operation of the transmission. Each of the subsystems monitors transmission operation, and detects and remediates faults related to torque transfer therein, including state faults of the torque transfer clutches affecting the output of the transmission.

The orthogonal subsystems preferably have separate, independent hardware and control algorithms, including the following: sensing devices of the subsystems are distinct and independent; electric power to the sensing devices is separate; signal transmission lines from the sensing devices utilize separate electric cables; and, the control modules monitoring the sensing systems and executing algorithmic code to process signals from the sensing devices are signally separate. Furthermore, there is no common fault between the orthogonal subsystems, and therefore the control system is able to monitor and mitigate operation in the presence of multiple faults, thus permitting continued operation of the transmission.

The first subsystem comprises hardware devices and algorithms to monitor a hydraulic circuit which controls the torque transfer clutch states in response to operating conditions and an operator torque request ('$T_{O\_REQ}$'). The first subsystem monitors pressures in the hydraulic circuit. A first control module is directly signally connected to pressure monitoring devices in the hydraulic circuit from which clutch state is monitored. The first control module is directly signally connected to a first sensing system operative to monitor output of the transmission. The first control module is directly operatively connected to a plurality of electro-hydraulic solenoids to control flow control valves and flow management valves in the hydraulic circuit, and thereby selectively controls clutch states and torque transfer through the transmission. The first control module executes algorithmic code to analyze the signals from the pressure monitoring devices and the first sensing system monitoring the transmission output speed, in context of the operator torque request and transmission control parameters including commanded clutch states. Fault detection comprises comparing measured hydraulic pressures indicative of states of specific clutches, and comparing the measured hydraulic pressures to expected hydraulic pressures based upon the commanded output, i.e., the operator torque request. When a fault is detected, the first control module selectively controls the flow control valves and flow management valves in the hydraulic circuit to mitigate operation in a timely manner, and executes remedial operations, as described herein.

The second subsystem comprises hardware devices and algorithms to monitor output of the transmission and operation of the electric machines in response to operating conditions and the operator torque request. The second subsystem monitors rotational speed output of the electric machines and output of the transmission. A second control module is directly signally connected to a speed sensor operative to monitor rotational speed of the electric machine and directly signally connected to a second sensing system operative to monitor output speed of the transmission. The second control module is directly operatively connected to a motor control processor comprising an electric power inverter device, and thereby controls electric power transmission to the electric machine. The second control module executes algorithmic code to analyze the signal outputs of speed sensors in context of the operator torque request and transmission control parameters including commanded speed and torque outputs of the electric motor. Fault detection comprises comparing measured rotational speed of the electric machines to commanded rotational speeds thereof. When a fault is detected, the second control module controls electric power transmission to the electric machines to mitigate operation in a timely manner, and may execute remedial action. The first and second monitoring systems are thus mutually independent.

Mechanical aspects of the exemplary transmission 10 are disclosed, for example, in detail in commonly assigned U.S. Pat. No. 6,953,409. The exemplary two-mode, compound-split, electro-mechanical hybrid transmission embodying the concepts of the present disclosure is depicted in FIG. 1. The transmission 10 includes an input shaft 12 having an input speed, $N_I$ that is preferably driven by the internal combustion engine 14, and an output shaft 64 having an output rotational speed, $N_O$.

The exemplary engine 14 comprises a multi-cylinder internal combustion engine selectively operative in several states to transmit torque to the transmission via shaft 12, and can be either a spark-ignition or a compression-ignition engine. The engine 14 has a crankshaft which is operatively connected to the transmission input shaft 12. The crankshaft is monitored by a sensing device 11 adapted to monitor rotational position and speed, $N_E$, thereof. The output of the engine, comprising speed $N_E$ and output torque can differ from transmission input speed $N_I$ and engine input torque $T_E$ when a torque management device (not shown) is placed therebetween.

The transmission 10 comprises three planetary-gear sets 24, 26 and 28, and four torque-transmitting devices, i.e., clutches C1 70, C2 62, C3 73, and C4 75. The hydraulic control system 42, preferably controlled by transmission control module ('TCM') 17, is operative to control clutch states. Clutches C2 and C4 preferably comprise hydraulically-applied rotating friction clutches. Clutches C1 and C3 preferably comprise hydraulically-controlled stationary devices grounded to the transmission case 68. Each clutch is preferably hydraulically applied, receiving pressurized hydraulic fluid via the hydraulic control circuit 42.

The first and second electric machines 56, 72 comprise motor/generator devices, also referred to herein as MG-A 56 and MG-B 72, which are operatively connected to the transmission via the planetary gears. Each of the machines includes a stator, a rotor, and a resolver assembly 80, 82. The motor stator for each machine is grounded to outer transmission case 68, and includes a stator core with coiled electrical windings extending therefrom. The rotor for MG-A 56 is supported on a hub plate gear that is operably attached to output shaft 60 via the second planetary gear set 26. The rotor for MG-B 72 is attached to sleeve shaft hub 66. The motor resolver assemblies 80, 82 are appropriately positioned and assembled on MG-A 56 and MG-B 72. Each resolver assembly 80, 82 may be a known variable reluctance device including a resolver stator, operably connected to the stator of each machine, and a resolver rotor, operably connected to the rotor of each machine described above. Each resolver 80, 82 comprises a sensing device adapted to sense rotational position of the resolver stator relative to the resolver rotor, and identify the rotational position. Signals output from the resolvers are interpreted to provide rotational speeds for MG-A 56 and MG-B 72, referred to as $N_A$ and $N_B$. Transmission output shaft 64 is operably connected to a vehicle driveline 90 to provide an output torque, $T_O$ to vehicle wheels. There is a transmission output speed sensor 84 adapted to monitor rotational speed and rotational direction of the output shaft 64. Each of the vehicle wheels is preferably equipped with a sensor 94 adapted to monitor wheel speed, $V_{SS-WFL}$, the output of which is monitored by one of the control modules of the control system to determine vehicle speed, and absolute and relative wheel speeds for braking control, traction control, and vehicle acceleration management.

The transmission 10 receives the engine input torque from the torque-generative devices, including the engine 14, MG-A 56 and MG-B 72, as a result of energy conversion from fuel or electrical potential stored in an electrical energy storage device ('ESD') 74. The ESD 74 is high voltage DC-coupled to a transmission power inverter module ('TPIM') 19 via DC transfer conductors 27. Preferably, MG-A 56 and MG-B 72 are three-phase AC machines each having a rotor operable to rotate within a stator that is mounted on a case of the transmission.

The TPIM 19 includes two motor control modules, MCP-A 22 and MCP-B 33, and hybrid control module ('HCP') 5, and is an element of the control system described hereinafter with regard to FIG. 2. MCP-A 22 transmits electrical energy to and from MG-A 56 by transfer conductors 29, and MCP-B similarly transmits electrical energy to and from MG-B 72 by transfer conductors 31. Electrical current is transmitted to and from the ESD 74 in accordance with whether the ESD 74 is being charged or discharged. TPIM 19 includes power inverters and respective motor control modules configured to receive motor control commands and control inverter states therefrom for providing motor drive or regeneration functionality. The inverters comprise known complementary three-phase power electronics devices. MCP-A 22 and MCP-B 33 each comprises controlled insulated gate bipolar transistors (IGBT) for converting DC power from the ESD 74 to AC power for powering one of the electrical machines MG-A 56, MG-B 72, by switching at high frequencies. There is typically one pair of IGBTs for each phase of each of the three-phase electric machines, MG-A 56 and MG-B 72.

Referring now to FIG. 2, a schematic block diagram of the exemplary control system, comprising an architecture consisting of distributed control modules, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A 56 and MG-B 72. The distributed control module architecture includes engine control module ('ECM') 23, transmission control module ('TCM') 17, battery pack control module ('BPCM') 21, and TPIM 19, which includes the HCP 5 and MCP-A 22 and MCP-B 33 in the embodiments described. There is a User Interface ('UI') 13 operably connected to a plurality of devices through which a vehicle operator typically controls and directs operation of the powertrain, including the transmission 10. The devices include an operator torque request ('$T_{O\_REQ}$') and operator brake ('BRAKE'), a transmission gear selector (i.e., PRNDL) (not shown), and, a vehicle speed cruise control (not shown). The transmission gear selector typically has a discrete number of operator-selectable positions, including direction of the output, i.e., one of a forward and a reverse direction.

The aforementioned control modules communicate with other control modules, sensors, and actuators via a local area network ('LAN') bus 6, as described herein. Specific control modules are configured to communicate via serial peripheral interface ('SPI') buses, as described herein. The LAN bus 6 facilitates structured communication between the various control modules consisting of sensor outputs, control parameters, and device commands. The communication protocol utilized is application-specific. The LAN bus provides for robust messaging and interfacing between the aforementioned control modules, and other control modules providing functionality such as antilock brakes, traction control, and vehicle stability. Multiple communications buses may be used to improve communications speed and provide some level of signal redundancy and integrity.

The HCP 5 provides supervisory control of the hybrid powertrain system, serving to coordinate operation of the ECM 23, TCM 17, TPIM 19, and BPCM 21. Based upon various input signals from the UI 13 and the powertrain, including the ESD 74, the HCP 5 generates various commands, including: the operator torque request ('$T_{O\_REQ}$'), a commanded output torque ('$T_{O\_CMD}$') to driveline 90, the engine input torque, $T_I$, clutch torques ('$T_{CL\_N}$') for the N various torque transfer clutches C1 70, C2 62, C3 73, C4 75 of the transmission 10; and motor torque commands $T_A$ and $T_B$ for MG-A 56 and MG-B 72. The TCM 17 is operatively connected to the hydraulic control circuit 42, including monitoring various pressure sensing devices (not shown) and generating and executing control signals for various solenoids to control pressure switches and control valves contained therein.

Figure 4:
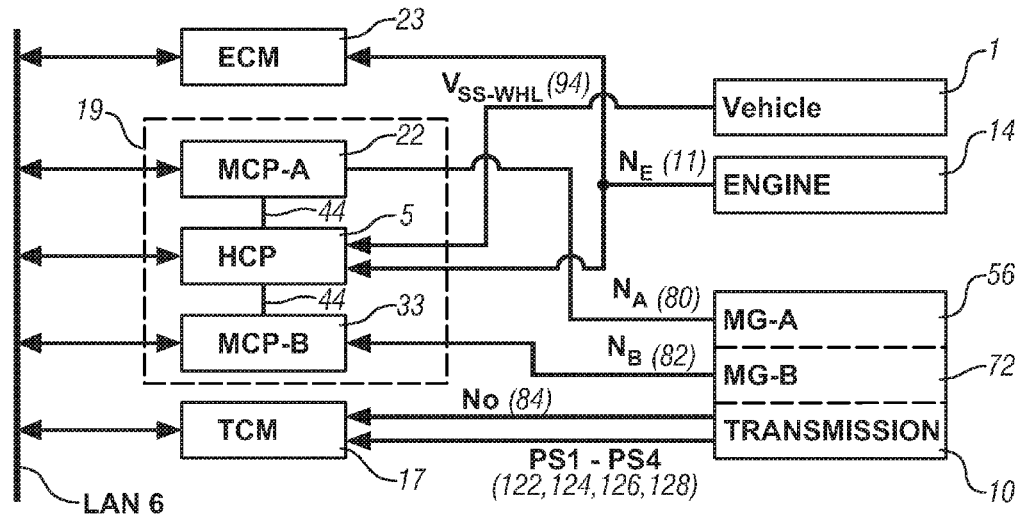
Figure 5:
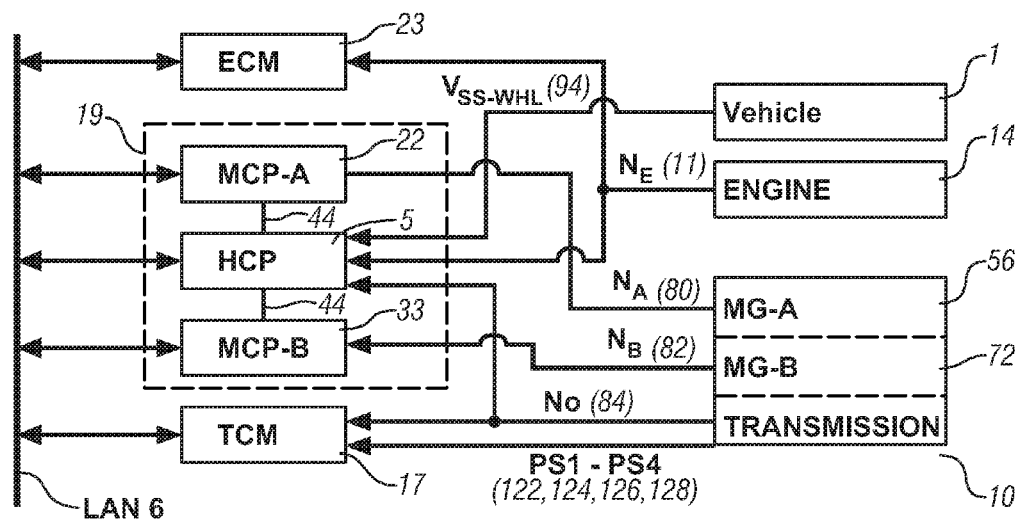

The system includes direct electrical signal connection between various elements of the powertrain system and specific control devices to facilitate communication of information outside normal channels afforded by the LAN bus 6, at a faster update rate to facilitate improved system control and diagnostic monitoring. The ECM 23 is directly connected to the engine 14 via the plurality of discrete lines collectively shown as aggregate line 35 in FIG. 2, some details of which are depicted in FIGS. 4 and 5. This includes a wire cable from the engine crankshaft position sensor 11 to provide engine speed, $N_E$. The wire cable from the engine crank position sensor 11 is directly wired in parallel to the one of the HCP control module of TPIM 19, to provide direct signal information from crank position sensor 11. The ECM 23 is preferably further directly connected to the engine 14 via aggregate line 35 in order to communicate vehicle-related inputs including coolant temperature, coolant level, and a hood switch, among other.

The TPIM 19 preferably includes the HCP 5, MCP-A 22, and MCP-B 33 control modules. There is a first SPI bus 44 between HCP 5 and MCP-A 22, and a second SPI bus 44 between MCP-A 22 and MCP-B 33. Each SPI bus comprises a full-duplex synchronous serial data link permitting direct communication between the devices. The MCP-A 22 directly and individually communicates with the HCP 5 and the MCP-B 33 via the first and second SPI buses 44, thus achieving high-speed communications between the devices without communications delays. In this embodiment, messages are typically sent from the HCP 5 to the MCP-A 22 and MCP-B 33 over the LAN bus 6 each 6.25 millisecond loop. Furthermore, messages are sent between the HCP 5 and MCP-A 22 and MCP-B 33 via the SPI buses 44. In the embodiment, there is a serial control interface (SCI) (not shown) which effects communication between the MCP-A 22 and the MCP-B 33.

The typical SPI-bus 44 comprises a 4-wire serial communications interface to provide a synchronous serial data link which supports a low/medium bandwidth (e.g., 1 megabaud) network connection among the control modules supporting the SPI. A synchronous clock shifts serial data into and out of microcontrollers of the control modules in blocks of 8 bits. The SPI bus is a master/slave interface, with the master driving a serial clock, and data being simultaneously transmitted and received in a full-duplexed protocol. In this application, the master comprises the HCP 5. Further specific details of SPI communications are known to a skilled practitioner and not discussed in detail herein.

The ECM 23 is operably connected to the engine 14, and functions to acquire data from a variety of sensors and control a variety of actuators, respectively, of the engine 14 over a plurality of discrete lines collectively depicted as aggregate line 35. The ECM 23 receives the engine input torque command from the HCP 5, and generates a desired axle torque, and an indication of actual engine input torque to the transmission, which is communicated to the HCP 5. For simplicity, ECM 23 is shown generally having bi-directional interface with engine 14 via aggregate line 35. Various other parameters that may be sensed by ECM 23 include engine coolant temperature and engine input speed, $N_E$, to shaft 12, which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission over a plurality of discrete lines collectively depicted as aggregate line 41. Inputs from the TCM 17 to the HCP 5 include estimated clutch torques for each of the N clutches, i.e., C1 70, C2 62, C3 73, C4 75, rotational output speed from transmission output sensor 84, and signal outputs from hydraulic pressure switch devices PS1, PS2, PS3, PS4 which are depicted with reference to FIG. 3. Other actuators and sensors may be used to provide additional information from the TCM 17 to the HCP 5 for control purposes. The TCM 17 monitors inputs from the pressure switches and selectively controls pressure control solenoids and shift solenoids to control various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, amp-hour throughput, battery voltage and available battery power.

Each of the aforementioned control modules is preferably a general-purpose digital computer generally comprising a microprocessor or central processing unit, storage mediums comprising read only memory ('ROM'), random access memory ('RAM'), electrically programmable read only memory ('EPROM'), high speed clock, analog to digital ('A/D') and digital to analog ('D/A') circuitry, and input/output circuitry and devices ('I/O') and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN bus 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The exemplary two-mode, compound-split, electro-mechanical transmission operates in one of several operating range states comprising fixed gear operation and continuously variable operation, described with reference to Table 1, below.

TABLE 1

| Transmission Operating Range State | Applied Clutches | |
|---|---|---|
| Mode I—Engine Off (MI_Eng_Off) | C1 70 | |
| Mode I—Engine On (MI_Eng_On) | C1 70 | |
| Fixed Gear Ratio 1 (FIG. 1) | C1 70 | C4 75 |
| Fixed Gear Ratio 2 (FIG. 2) | C1 70 | C2 62 |
| Mode II—Engine Off (MII_Eng_Off) | C2 62 | |
| Mode II—Engine On (MII_Eng_On) | C2 62 | |
| Fixed Gear Ratio 3 (FIG. 3) | C2 62 | C4 75 |
| Fixed Gear Ratio 4 (FIG. 4) | C2 62 | C3 73 |

The various transmission operating range states described in the table indicate which of the specific clutches C1 70, C2 62, C3 73, C4 75 are applied for each of the operating range states. A first mode, i.e., Mode I, is selected when clutch C1 70 only is applied in order to "ground" the outer gear member of the third planetary gear set 28. The engine 14 can be either on or off. A second mode, i.e., Mode II, is selected when clutch C2 62 only is applied to connect the shaft 60 to the carrier of the third planetary gear set 28. Again, the engine 14 can be either on or off. For purposes of this description, Engine Off is defined by engine input speed, $N_E$, being equal to zero revolutions per minute ('RPM'), i.e., the engine crankshaft is not rotating.

Modes I and II refer to circumstances in which the transmission functions are controlled by one applied clutch, i.e., either clutch C1 62 or C2 70, and by the controlled speed and torque of the electric machines MG-A 56 and MG-B 72, which can be referred to as a continuously variable transmission mode. Certain ranges of operation are described below in which fixed gear ratios are achieved by applying an additional clutch. This additional clutch may be the unapplied one of clutch C1 70 or clutch C2 62 or clutch C3 73 or C4 75, as depicted in Table 1, above. When the additional clutch is applied, fixed ratio operation of input-to-output speed of the transmission, i.e., $N_I/N_O$, is achieved. The rotations of machines MG-A 56 and MG-B 72, i.e., $N_A$ and $N_B$, are dependent on internal rotation of the mechanism as defined by the clutching and proportional to the input speed measured at shaft 12.

Figure 3:
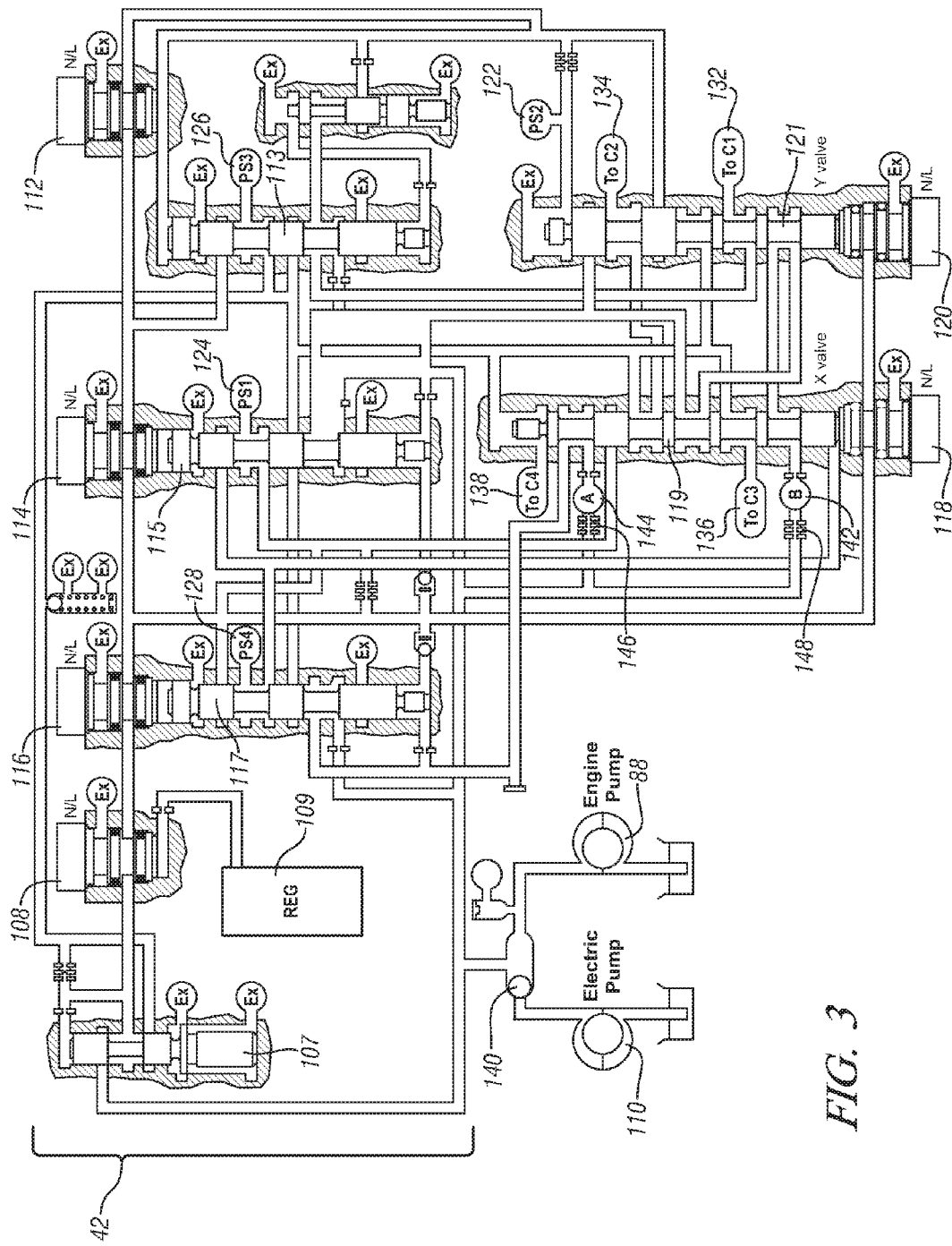

Referring to FIG. 3, a schematic diagram providing a more detailed description of the exemplary electro-hydraulic system for controlling flow of hydraulic fluid in the exemplary transmission is shown. A main hydraulic pump 88, driven off the input shaft 12 from the engine 14, and an auxiliary pump 110, operatively electrically controlled by the TPIM 19, provide pressurized fluid to the hydraulic control circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into hydraulic control circuit 42, which is operable to selectively distribute hydraulic pressure to a series of devices, including the torque transfer clutches C1 70, C2 62, C3 73, and C4 75, active cooling circuits for MG-A 56 and MG-B 72, and a base cooling circuit for cooling and lubricating the transmission 10 via passages 142, 144, including flow restrictors 148, 146 (not depicted in detail). As previously stated, the TCM 17 controls the various clutches to achieve various transmission operating modes through selective control of pressure control solenoids ('PCS') PCS1 108, PCS2 112, PCS3 114, PCS4 116 and solenoid-controlled flow management valves X-valve 119 and Y-valve 121. The circuit is fluidly connected to pressure switches PS1, PS2, PS3, and PS4 via passages 124, 122, 126, and 128, respectively. There is an inlet spool valve 107. The pressure control solenoid PCS1 108 has a control position of normally high and is operative to modulate magnitude of fluidic pressure in the hydraulic circuit through fluidic interaction with controllable pressure regulator 109. Controllable pressure regulator 109, not shown in detail, interacts with PCS1 108 to control hydraulic pressure in the hydraulic circuit 42 over a range of pressures, depending upon operating conditions as described hereinafter. Pressure control solenoid PCS2 112 has a control position of normally low, and is fluidly connected to spool valve 113 and operative to effect flow therethrough when actuated. Spool valve 113 is fluidly connected to pressure switch PS3 via passage 126. Pressure control solenoid PCS3 114 has a control position of normally low, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve with which to control flow to different devices in the hydraulic circuit 42 and the transmission 10. The X-valve 119 is operative to direct pressurized fluid to clutches C3 73 and C4 75 and cooling systems for stators of MG-A 56 and MG-B 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS2 via passage 122. A more detailed description of the exemplary hydraulic control circuit 42 is provided in commonly assigned U.S. patent application Ser. No. 11/263,216.

An exemplary logic table to accomplish control of the exemplary electro-hydraulic control circuit 42 is provided with reference to Table 2, below.

TABLE 2

| Operating State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| Mode I (EVT Low) | 0 | 0 | Line Modulation | MG-B Stator Cool | C1 | MG-A Stator Cool |
| Mode II (EVT High) | 0 | 1 | Line Modulation | C2 | MG-B Stator Cool | MG-A Stator Cool |
| Low Range FG1, FG2 Mode I | 1 | 0 | Line Modulation | C2 | C1 | C4 |
| High Range FG3, FG4 Mode II | 1 | 1 | Line Modulation | C2 | C3 | C4 |

Selective control of the X-valve 119 and Y-valve 121 and actuation of the solenoids PCS2, PCS3, and PCS4 facilitate flow of hydraulic fluid to selectively apply clutches C1 70, C2 62, C3 73, C4 75 and provide cooling for the stators of MG-A 56 and MG-B 72.

In response to an operator's action, as captured by the UI 13, the HCP 5 and one or more of the other control modules determine the commanded output torque intended to meet the operator torque request to be effected at shaft 64. Final vehicle acceleration is affected by other factors, including, e.g., road load, road grade, and vehicle mass. The operating mode is determined for the transmission based upon a variety of operating characteristics of the powertrain. This includes the operator torque request, typically communicated through the inputs to the UI 13 as previously described. The operating mode may be predicated on a powertrain torque demand caused by a control module command to operate of the electric machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A 56 and MG-B 72. The control system manages torque inputs from the engine 14 and MG-A 56 and MG-B 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired output torque, as described hereinbelow. Under the direction of the HCP 5, the transmission 10 operates over a range of output speeds from slow to fast in order to meet the operator demand.

Referring now to FIGS. 4 and 5, first and second embodiments are now described, in context of the electro-mechanical transmission and powertrain system described with reference to FIGS. 1, 2, and 3 and Tables 1 and 2. The TCM 17, ECM 23, and TPIM 19 are signally connected via LAN bus 6, which provides structured communications therebetween. Furthermore, the TPIM 19 comprises control modules MCP-A 22, HCP 5, and MCP-B 33, including internal SPI communications link 44 for direct communications therebetween, as previously described.

The first subsystem comprises the hydraulic circuit 42 of the transmission 10 which is directly connected to TCM 17 for signal transmission and clutch control thereof. This includes the TCM 17 directly signally connected to each of the pressure switches PS1, PS2, PS3, PS4 and output speed sensor 84 via discrete wiring harness cables. As previously described, TCM 17 is operatively connected to each of the pressure control solenoids and flow management valves of the hydraulic circuit. Furthermore, the TCM 17 includes program code in the form of algorithms and predetermined calibrations to analyze the signals from the pressure monitoring devices and monitor the transmission output speed from sensor 84. When one of the operating range states (described with reference to Table 1) is commanded, each of the clutches is applied or released, by actuating specific ones of the pressure control solenoids and flow management valves. Each of the pressure switches has an expected output, depending upon the commanded operating range state. The TCM 17 program code periodically monitors outputs of the pressure switches and compares it to the expected output to detect presence of a stuck clutch. When a stuck clutch is detected, the TCM 17 remediates, such remediation dependent upon which of the clutches is determined stuck, and whether it is stuck open (released) or closed (applied). Remediation preferably includes commanding the X-valve 119 to a '0' or low operating state, to control the transmission in one of the continuously variable operating range states, as described with reference to Table 2, above. Other remediation may include limiting operation to a single gear or mode when it is determined that the X-valve 119 is stuck.

The second subsystem comprises the electric machines MG-A 56 and MG-B 72 which are directly connected to the TPIM 19 comprising the HCP 5, MCP-A 22 and MCP-B 33. The TPIM 19 is directly signally connected to the resolver 80 of MG-A 56 via MCP-A 22 and directly signally connected to the resolver 82 of MG-B 72 via MCP-B 33, each signal connection comprising discrete wiring harness cables. The signal, $V_{SS\text{-}WHL}$, from wheel speed sensors 94 of the driven wheels of the vehicle is input to the HCP 5, from which the HCP 5 is able to determine and monitor the transmission output speed based upon an axle ratio. As previously described, MCP-A 22 and MCP-B 33 are operatively connected to the electric machines. Furthermore, the MCP-A 22 and MCP-B 33 each include program code in the form of algorithms and predetermined calibrations to analyze the signals from the resolvers and monitor the transmission output speed from the wheel speed sensors 94. The TPIM 19 monitors rotational speeds of MG-A 56 and MG-B 72 and the transmission output speed to determine which of the clutches is applied and which of the clutches is released, based upon whether or not there is zero slippage across each clutch. Slippage is determined based upon gear ratios and relative speeds of the clutches and electric machines. A comparison is made between commanded clutch states for a commanded operating range state and the determined clutch states to identify whether and when one or more of the clutches is stuck closed (applied) or stuck open (released). A stuck-closed clutch is determined when one of the clutches has zero slippage when slippage is expected, thus indicating the clutch is applied. A stuck-open clutch is determined when one of the clutches has some level of slippage when zero slippage is expected, thus indicating the clutch is released. Furthermore, the TPIM 19 also monitors electric current through each of MG-A 56 and MG-B 72 to compare commanded motor speeds to the transmission output speed. When a stuck clutch is identified, the HCP 5 remediates. The remediation comprises controlling mechanical power output of the electric machines, typically by reducing electric current flow to the electric machines to reduce mechanical torque output therefrom.

Referring now to FIG. 5, an alternative embodiment is described. In this embodiment, the second subsystem includes the transmission output speed sensor 84 directly signally connected to HCP 5 via a wire cable, from which the HCP is able to determine and monitor the transmission output speed.

In each of the embodiments described, there are two independent subsystems to detect faults in clutch application, and two independent methods to remediate the operation of the transmission in the event of a detected fault in clutch application. The two subsystems employ separate and distinct sensors and control methods, thus having no shared failure modes, to reduce risk of unintended clutch states due to faults. The configuration permits limited operation in presence of a single fault. The first subsystem monitors hydraulic pressure and output from the pressure switches, and remediates using hydraulic controls, whereas the second subsystem monitors motor speeds and output speed and remediates using electric controls. The algorithmic codes are executed in different and separate control modules. Alternatively, a single control module can be adapted to monitor and control the hydraulic subsystem and the electric subsystem as described, albeit with some increased risk related to common-mode faults in the control module.

In configuring the electro-mechanical transmission described hereinabove, the TCM 17 is operatively connected to the flow management valves and pressure control solenoids to selectively control torque transfer clutch states, and is directly signally connected to the pressure monitoring devices to monitor the hydraulic circuit. The TCM executes algorithmic code to detect a fault in the torque transfer clutch states affecting the power flow to the output based upon the signal outputs of the pressure monitoring devices and executes remedial control upon detection of the fault. Similarly, the HCP 5 executes algorithmic code to detect any fault in the output of the transmission based upon the rotation of the electric machine, indicative of unexpected clutch states and, executes remedial control upon detection of a fault. The remedial control by the TCM 17 comprises selectively controlling the flow management valves and pressure control solenoids to control transmission operation in the continuously variable operating range state, typically by controlling the X-valve to low state, as described with reference to Table 2. The remedial control by the HCP 5 comprises controlling speed and torque output of the electric machines by controlling electric power thereto.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A transmission system for transmitting mechanical power flow originating from an engine and an electric machine to an output, comprising:
   an input, planetary gear sets, torque transfer clutches, a hydraulic circuit, and first and second control modules;
   the input operatively connected to one of the planetary gear sets;
   the hydraulic circuit comprising flow management valves and pressure control solenoids selectively operative to apply the torque transfer clutches;
   the torque transfer clutches selectively actuable to control operation in one of a fixed gear operating range state and a continuously variable operating range state;
   the first control module:
      a) operatively connected to the flow management valves and the pressure control solenoids to selectively apply the torque transfer clutches;
      b) directly signally connected to pressure monitoring devices adapted to monitor the hydraulic circuit;
      c) operative to execute algorithmic code to detect a fault in the torque transfer clutches affecting the mechanical power flow to the output based upon the signal outputs of the pressure monitoring devices; and,
      d) operative to execute remedial control upon fault detection; and
   the second control module:
      a) operatively connected to an electric power inverter to control electric power flow to the electric machine,
      b) directly signally connected to a sensing system operative to monitor rotation of the electric machine;
      c) directly signally connected to a sensing system operative to monitor rotation of the output of the transmission;
      d) operative to execute algorithmic code to detect a fault affecting the mechanical power flow to the output of the transmission based upon the rotation of the electric machine and output of the transmission; and,
      e) operative to execute remedial control of the electric machine upon detection of a fault.

2. The transmission of claim 1, wherein the first control module and the second control module are mutually independent.

3. The transmission of claim 1, wherein the first control module operative to execute remedial control upon fault detection comprises the first control module operative to selectively control the flow management valves and pressure control solenoids to control transmission operation in a continuously variable operating range state.

4. The transmission of claim 1, wherein the second control module operative to execute remedial control of the electric machine upon detection of a fault comprises the second control module operative to control mechanical power output from the electric machine.

5. The transmission of claim 1, further comprising:
   the transmission operative to transmit mechanical power originating from a plurality of electric machines to the output; and
   the second control module:
      a) operatively connected to respective electric power inverters to control electric power flow to each of the electric machines, b) directly signally connected to respective sensing systems operative to monitor rotation of each of the electric machines, and,
c) directly signally connected to a sensing system operative to monitor rotation of the output of the transmission;
d) operative to execute algorithmic code to detect a fault affecting the mechanical power flow to the output of the transmission based upon the rotations of the electric machines and output of the transmission, and,
e) operative to execute remedial control of the electric machines upon detection of a fault.

6. The transmission of claim 5, wherein the second control module operative to execute remedial control of the electric machines upon detection of a fault comprises the second control module operative to control mechanical power output of each of the electric machines.

* * * * *